United States Patent Office

3,566,639
Patented Mar. 2, 1971

3,566,639
GAGE CONTROL FOR MULTISTAND
ROLLING MILL
Paul E. Dornbusch, Roanoke, Va., assignor to
General Electric Company
Filed Nov. 21, 1968, Ser. No. 777,569
Int. Cl. B21b 37/02
U.S. Cl. 72—8                4 Claims

ABSTRACT OF THE DISCLOSURE

An apparatus for controlling the gage of a metal strip from one stand of a multistand rolling mill having at least two stands by controlling the speed of one of the stands in response to a signal from an X-ray gage, positioned between these stands, which represents deviation from expected gage, delayed for a period of time equal to the transport time for that portion of strip containing the deviation to move from the X-ray gage to the roll bite of the successive stand, less the response time of the speed regulator of the controlled stand. The gage deviation signal is advanced through a shift register circuit such that the deviation information is stored while the strip travels from the X-ray gage to the roll bite of the stand. A tachometer provides a voltage which controls the pulse rate of the shifting pulses such that the pulse rate is proportional to the output of the tachometer, or speed of the strip. The gage deviation signal after having been delayed is divided by the gage reference, or expected gage, signal for producing a current signal which is proportional to the unit deviation. This signal is then multiplied by the speed reference signal to produce a voltage signal proportional to the absolute speed change used for altering the tension in the strip, the reduction of the strip being corrected so that the delivered gage of the strip remains constant.

BACKGROUND OF THE INVENTION

The present invention relates to a gage control for the correction of the gage errors in metal strip being processed in a rolling mill. During the process of metal rolling in a tandem rolling mill, the metal strip coming into the mill is passed from one stand to the next. Very often the incoming strip to the mill is not of uniform gage and since the "volume flow" of the metal through the mill is constant throughout the mill, an error in gage in the incoming strip will result in an error in the delivered strip if the relative speeds of the stands remain constant, unless corrected during the rolling process. There are several methods of correcting these gage errors, one of which is the adjustment of the roll opening of the stand following the gage error detector as a response to the error signal. An example thereof is presented in U.S. Pat. 3,169,424 wherein a single stand rolling mill has a first tachometer at its entry side and a second tachometer at its delivery side. The volume flow of the material through the stand is at all times constant so that when the material has been reduced in gage by the rolls of the stand the strip at the delivery side of the mill must move faster than the strip entering the mill. The ratio of the speeds is inversely proportional to the ratio in gage of the strip entering and leaving the stand. Control means compares the speed of the incoming strip with the speed of the delivered strip with respect to the incoming gage. When an error is detected by the X-ray gage an imbalance in the control signals from the three sources causes an adjustment in the roll opening to be made, thereby restoring the balance among the signals. The delivery speed of the strip is constantly compared with the entry speed of the strip so that adjustments of the roll opening are made continuously.

This type of control, while very accurate, is complicated to implement since a great amount of equipment is required to perform the various functions required for continuous control. The control must calculate deviation from the desired delivery gage, using input signals from the entry X-ray gage, entry tachometer and delivery tachometer; it must determine the amount of movement of the screws required, and provide for a time delay in action of the screwdown control, since the X-ray gage, placed before the rolling stand, "sees" the error in the strip entering the mill before the "off gage" strip reaches the rolls where the correction is to be made. Since time varies with the speed of the strip, the delay must be controlled as a function of the speed.

SUMMARY OF THE INVENTION

The present invention greatly simplifies the equipment required to perform the functions involved in gage control of a metal strip being processed in a rolling mill having at least two stands, one of which is speed adjustable with respect to the other. A gaging apparatus positioned between the two stands measures the deviations present in the metal about to enter the rolls of the stand following the gaging apparatus. The system predicts what the delivered gage will be, based on this deviation measurement and the relative speeds of the two stands. The system, as a result of this prediction, produces a correction signal for changing the speed relation between the two stands in proportion to the gage variation detected by the gaging apparatus.

The speed correction is delayed for a time equal to that required for the "off gage" part of the strip to travel from the gaging apparatus to the roll bite of the stand, less the time required for the speed correction so that the speed change takes place when the off gage strip first enters the roll bite.

DETAILED DESCRIPTION

Figure 1:
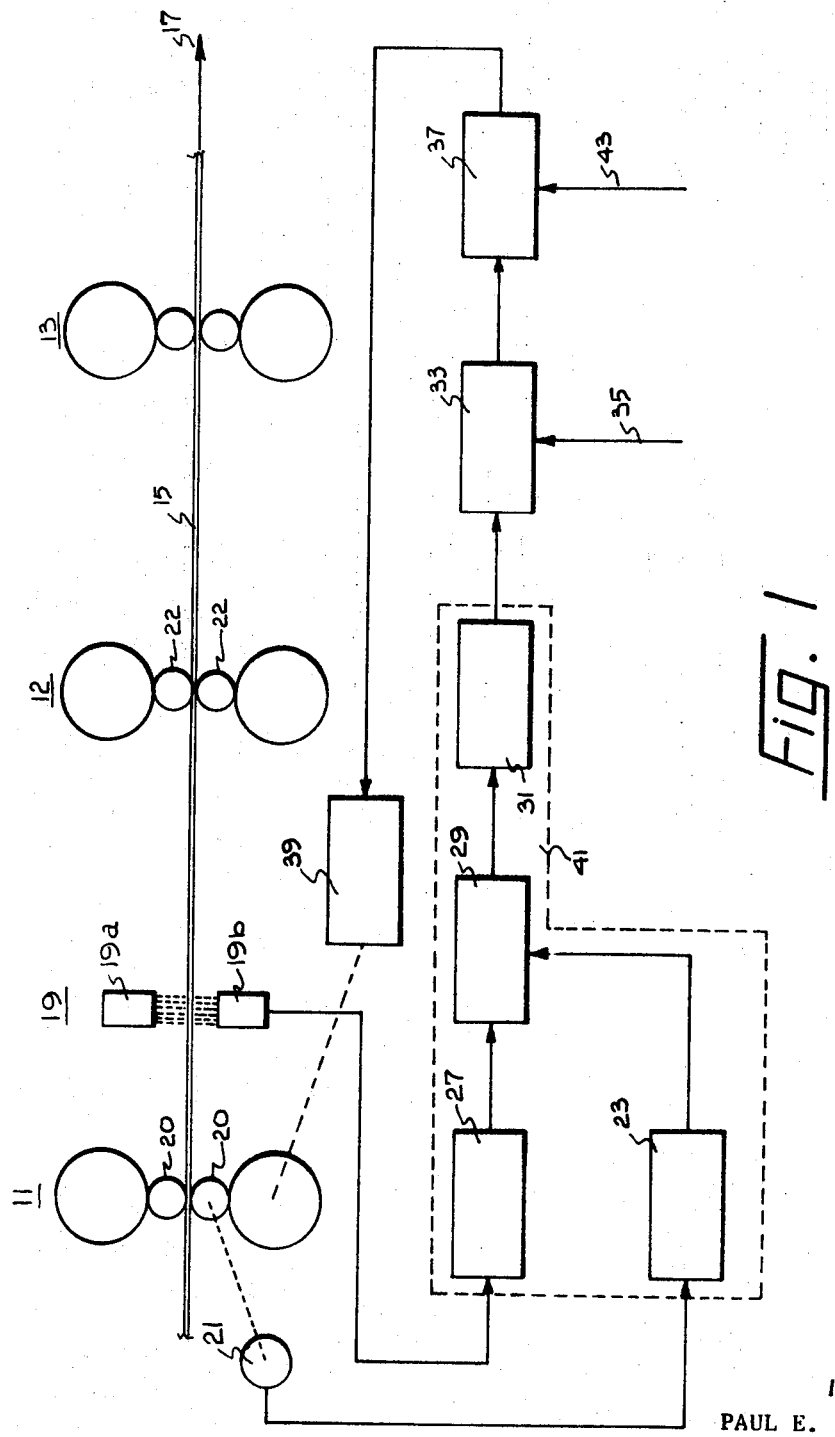
FIG. 1 is a block diagram of the gage control as used in a multistand rolling mill.

Referring to FIG. 1, numerals 11, 12 and 13 identify three consecutive stands of a multistand rolling mill through which a metal strip 15 is being fed in the direction of arrow 17. A gage measuring device, such as an X-ray gage 19 having an upper portion 19a producing the X-rays and a lower portion 19b an X-ray sensor, is positioned between stands 11 and 12 so that the metal strip 15 passes in between the upper and lower portions of the X-ray gage. Tachometer 21 is connected to and driven by the work rolls 20 of stand 11 and produces a voltage signal which is proportional to the speed of the work rolls and consequently proportional to the speed of metal strip 15. The X-ray gage 19 produces an electrical signal which is proportional to any deviation in gage, from a set gage, of metal strip 15 while it passes between the upper and lower portions 19a and 19b, respectively. This signal is applied to an A/D converter 27 which converts the analog signal derived from the X-ray gage 19 to digital numbers which are stored in and shifted through shift register 29 in response to shift pulses from the analog to pulse rate converter 23. The resultant pulsed signals are applied to a D/A converter 31 wherein an analog signal is produced, which is applied to a dividing circuit 33 where this signal is divided into the set or reference gage signal 35, representing the desired gage of the metal. The resulting signal produced by the dividing circuit 33, representing per unit deviation from expected gage, is applied to a multiplying circuit 37, where it is multiplied with the speed reference signal 43, representing the speed of the stand 11. The resultant signal produced by the multiplying circuit 37 represents the absolute speed change required at stand 11 to make stand 12 deliver desired gage. This signal is now applied to the speed regulator 39 which is caused to adjust the speed of the stand 11 whereby the speed of this stand is increased or decreased, depending on the conditions, resulting in a change in the tension in the strip 15 between stands 11 and 12 at a time when the error point in strip 15 first detected by the X-ray gage 19, reaches the work rolls 22 of stand 12.

The A/D converter 27, the shift register 29, the D/A converter 31 and the analog to pulse rate converting circuit 23 form a delay line represented by dotted block 41. When the X-ray gage 19 detects an error in the gage of the metal strip 15, an error signal is produced which without a delay produced by delay line 41 would cause the speed regulator 39 to instantly change the speed of stand 11, thereby causing a change in tension in strip 15. However, since a change in tension has an immediate effect on that portion of the strip which is located between the rolls (the roll bite) of stand 12, the correction in gage produced by the change in tension in strip 15 must be delayed so that the portion having the error in gage has time to reach stand 12 before applying the speed change signal to the speed regulator. This delay is equal to the transport time for the point of error in the metal strip to travel from the X-ray gage 19 to the roll bite of stand 12 minus a fixed interval of time selected to be equal to the response time of the speed regulator. (Response time of the speed regulator 39 is constant for all speeds.) This transport time of the point of error in the metal strip to travel from the X-ray gage 19 to the roll bite of stand 12 is directly proportional to the speed of strip 15, hence a variable in the process. Tachometer 21 produces a voltage which is applied to the analog to pulse rate converter 23 wherein the voltage is integrated to a preset level. The fixed time portion of the total transport time representing the response time of the speed control is obtained by reducing the preset voltage by an amount which is directly proportional to the voltage derived from the tachometer 21.

Figure 2:
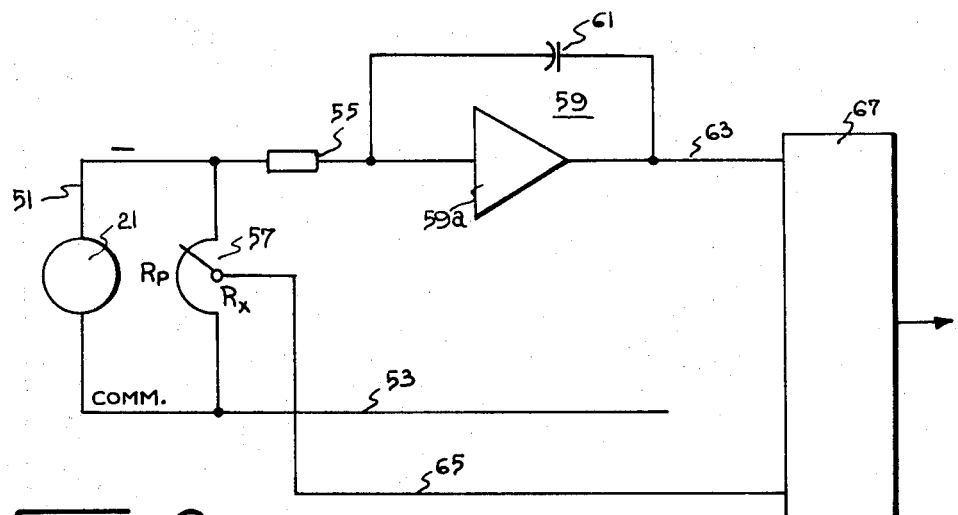
FIG. 2 is a functional diagram of the time delaying circuitry for the error signal.

Referring now to FIG. 2, the functional diagram representing the analog to pulse rate converter 23 is FIG. 1, has the tachometer 21 connected to a negative tachometer bus 51 and a common bus 53. The negative tachometer bus 51 is connected through resistor 55 to the operational amplifier 59a and capacitor 61, which together form integrator 59 which produces a positive voltage signal and applies this to bus 63. A voltage divider circuit connected between negative tachometer bus 51 and common bus 53 through potentiometer 57 has the slider contact of potentiometer 57 connected to a bus 65 thereby producing a voltage of negative polarity with respect to the common bus 53, having a magnitude proportional to the position of the slider $R_x/R_p$ of potentiometer 57 wherein $R_p$ is the resistance of the potentiometer and $R_x$ is that portion enclosed by the slider. The potential between negative bus 65 and positive bus 63 represents the preset level of voltage at which the control circuit 67 is to produce a signal which causes the shift register 29 in FIG. 1 to shift its contents from one stage to the next. By adjusting the slider on the potentiometer 57, the potential level of negative bus 65 may be raised or lowered with respect to common bus 53, thereby altering the preset voltage level. The tachometer 21 produces a voltage proportional to the speed which is applied to the integrator 59. As speed of the strip increases, the potential between the common bus 53 and negative tachometer bus 51 increases and negative bus 65 becomes more negative with respect to the common bus 53; i.e., an increase in the potential between the negative bus 65 and the common bus 53. This potential represents the fixed time delay required for response of the speed regulator. As the potential increases between the negative bus 65 and the common bus 53, less of a potential is required between the common bus 53 and the positive bus 63 to attain the preset value necessary for the control circuit 67 to produce the necessary signal, which will cause the shift register 29 (FIG. 1) to shift. Simultaneously, with the increase in voltage from the tachometer, integrator 59 will integrate up to the necessary potential level quicker than with lower voltages resulting from lower speeds of the strip. To summarize, an increase of speed resulting in an increase of voltage from the tachometer 21 therefore results in two separate actions. (1) A lowering of the integrated potential level; and (2) an increase in the rate at which the integrator 59 will attain that potential level.

Figure 3:
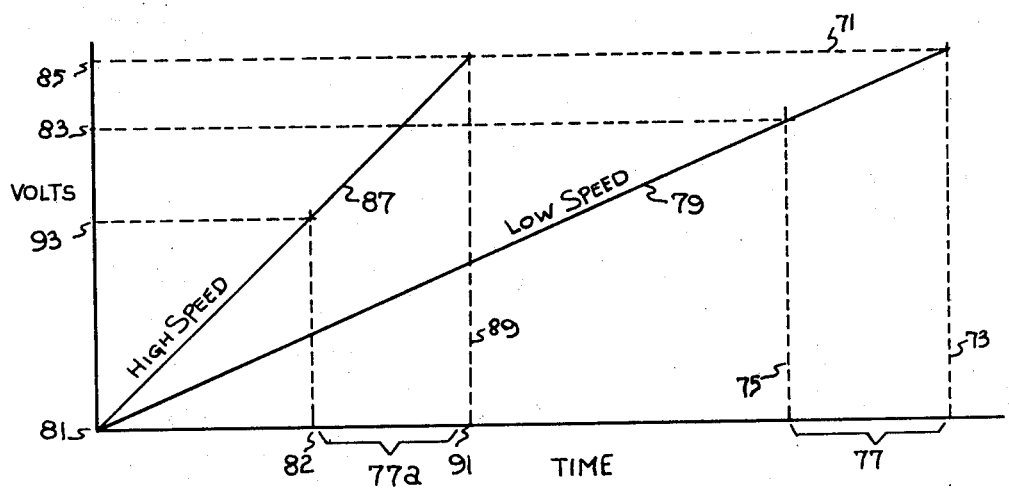
FIG. 3 shows a graph presenting the relationship of the variable time delay and the fixed time delay as controlled by the circuitry shown in FIG. 2.

To further aid in the explanation of the relationship of time and volts with respect to the speed of the strip, FIG. 3 shows line 71 representing the preset voltage at which the circuit 67 in FIG. 2 produces a signal which causes the shift register 29 in FIG. 1 to shift its contents from one stage to the next. In FIG. 3 the response time of the speed regulator is represented by the distance between lines 73 and 75, identified by numeral 77. Line 79 represents the rate at which the tachometer voltage is integrated at low speed of the metal strip being processed. The transport time, the time required for a point on the metal strip to travel from the gaging apparatus to the roll bite of the stand, is represented on the base line by the distance between point 81 and the intersection of line 73 and the base line. The response time of the speed control identified by numeral 77 is subtracted from the transport time to acquire the time at which shift register 29 must shift. It is therefore necessary for the tachometer voltage to be integrated to a value represented by the point where line 79 intersects with line 75. This point when projected onto the vertical ordinate represents the potential to which the positive bus 63 (FIG. 2) must be raised to attain the preset level which will cause the shift register 29 (FIG. 1) to shift. In the graph in FIG. 3, this potential is represented by the distance between points 81 and 83. The voltage representing the fixed response time of the speed regulator is represented by the distance 83 to 85.

Assume now that the speed of the strip is increased so that the voltage will integrate at a faster rate, as represented by line 87. To reach the preset voltage level represented by line 71 the transport time is represented by the distance from point 81 to point 91. The fixed time interval 77a which represents the response time for the speed regulator must be subtracted from this to attain the time period for the shift register 29 (FIG. 1) to shift, represented by the distance 81 to 82. Projecting point 82 to the line 87 and projecting this on to the vertical ordinate, it is seen that the potential to which the positive bus 63 (FIG. 2) must be raised is represented by the distance between points 81 and 93 in FIG. 3. The fixed time representing the response time 77a of the speed regulator is now represented by a voltage equal to the distance between point 93 and 85. The response time 77a is constant and is shown of equal size as response time 77 at low speed of the strip. referring now to FIG. 2, each time the preset voltage between negative bus 65 and positive bus 63 is reached, circuit 67 produces a signal which resets the integrator 59, causing the integrating cycle to be repeated, a function which is not shown. The signal is also applied to the shift register 29 in FIG. 1, whereby the error signal stored therein is shifted to succeeding stages each time a signal from the analog to pulse rate circuit 23 is applied to the shift register's shift input.

While the foregoing description of the invention has been directed to illustrating an embodiment wherein the speed of the rolls 20 is changed under control of the apparatus to adjust gage via regulating tension between stands 11 and 12, it is also obvious that the speed of the rolls 22 may be changed in a similar manner to bring about the same result. In other words for the purposes of this invention reducing the speed of rolls 20 is the full equivalent of increasing the speed of rolls 22 and vice versa.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specifice operating environments and conditions. It is therefore contemplated by the appended claims to cover all such modifications as fall within the scope and spirit of the invention.

I claim:

1. In a metals rolling mill having consecutive pairs of rotating rolls through which a length of material is processed; means for determining the speed of a first pair of rolls and for providing a speed signal proportional thereto; means located a predetermined distance between said first pair of rolls and a next pair of rolls for producing a gage signal proportional to deviation in thickness of an adjacent portion of said length of material with respect to a predetermined thickness; delay means for receiving said gage signal and for providing an output signal proportional, but delayed in time, with respect thereto, said delay means acting under the control of the first recited means for providing the amount of time delay; a series arrangement including a dividing circuit and a multiplying circuit for producing a change signal representing a speed change required by one of said pairs of rollers to vary the tension in the length of material between said consecutive pairs of rolls whereby said deviation in thickness will be corrected; and control means responsive to said change signal to adjust the speed of one of said pairs of rollers.

2. The invention in accordance with claim 1 wherein said delay means provides a time delay substantially equal to the amount of time corresponding to material travel time from said means producing said gage signal and the next pair of rolls minus a predetermined amount of time representing response time of said control means.

3. The invention in accordance with claim 1 wherein said delay means includes a shift register through which indicia of the gage signal is passed at a rate determined by said speed signal.

4. The invention in accordance with claim 1 wherein said dividing circuit provides a quotient output signal resulting from the division of a reference gate signal proportional to the desired material thickness by said gage signal and said multiplying circuit provides said change signal as the result of multiplication of said quotient output signal by a speed reference signal proportional to the actual speed of said first pair of rollers.

References Cited

UNITED STATES PATENTS

| 2,949,799 | 8/1960 | Walker | 72—234X |
| 3,081,654 | 3/1963 | Wallace | 72—16X |
| 3,162,069 | 12/1964 | McLay et al. | 72—9 |
| 3,174,317 | 3/1965 | Camp | 72—12 |
| 3,212,310 | 10/1965 | Brys | 72—12 |
| 3,448,600 | 6/1969 | Coleman et al. | 72—8 |

MILTON S. MEHR, Assistant Examiner

U.S. Cl. X.R.

72—11, 16

UNITED STATES PATENT AND TRADEMARK OFFICE
CERTIFICATE OF CORRECTION

PATENT NO. : 3,566,639
DATED : NOVEMBER 21, 1968
INVENTOR(S) : P. E. DORNBUSCH

It is certified that error appears in the above-identified patent and that said Letters Patent are hereby corrected as shown below:

Column 2, line 71, delete "into" and substitute --by--.

Column 6, line 13, Claim 4, delete "gate" and substitute --gag line 14, Claim 4, delete "by" and substitute --into- Signed and Sealed this Twenty-sixth Day of May 1981

[SEAL]

Attest:

RENE D. TEGTMEYER

Attesting Officer  Acting Commissioner of Patents and Trade